United States Patent Office 2,861,842
Patented Nov. 25, 1958

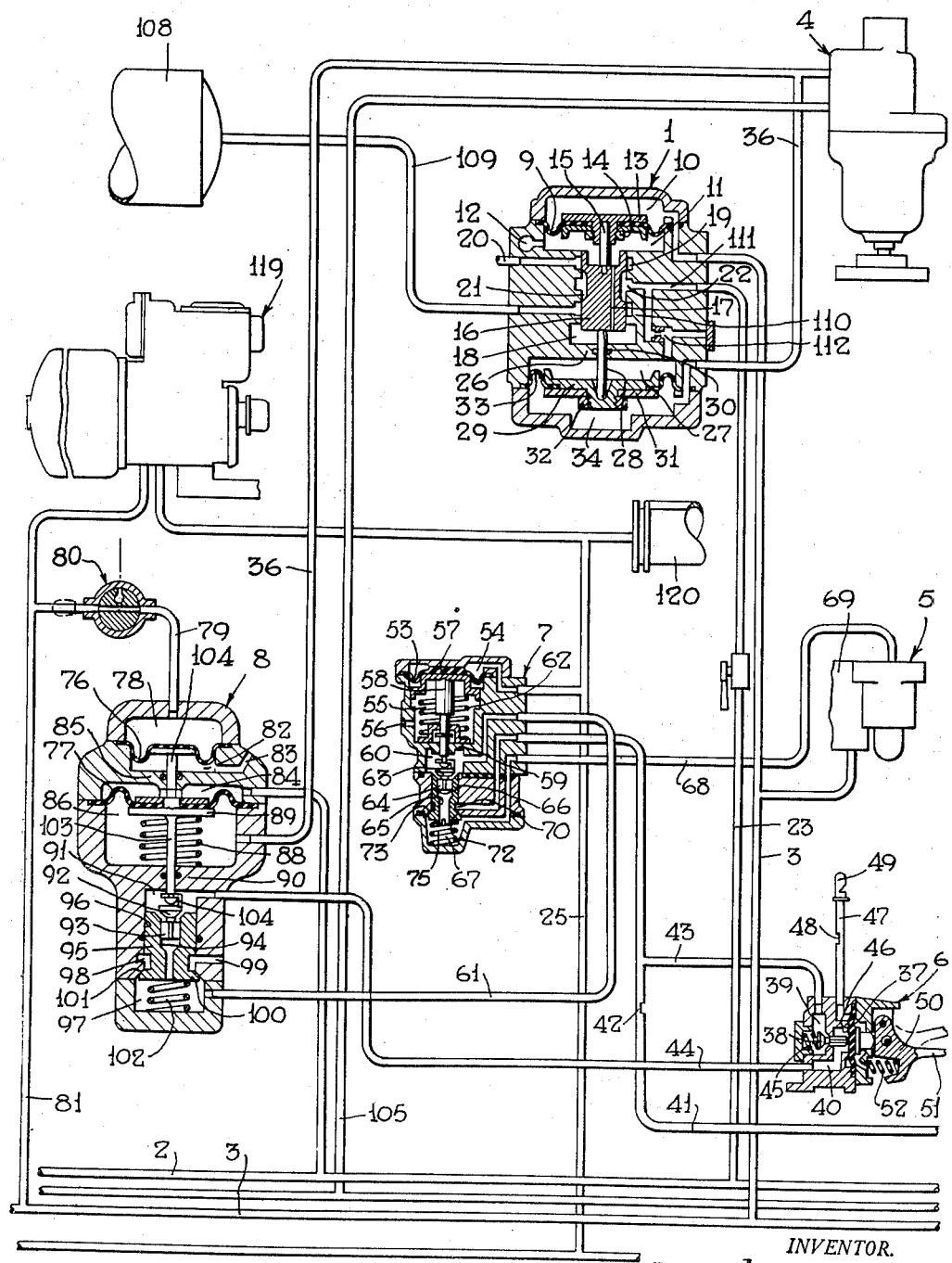

2,861,842

PRESSURE AND VACUUM BRAKE SYSTEMS INTERLOCK APPARATUS

Douglas R. Borst, Pitcairn, Pa., assignor to Westinghouse Air Brake Company, Wilmerding, Pa., a corporation of Pennsylvania Application July 19, 1955, Serial No. 522,906

9 Claims. (Cl. 303—4)

This invention relates to combined automatic compressed air and vacuum operated brake equipment for a railway locomotive and more particularly to a railway locomotive brake equipment which is operated by an automatic compressed air system and may serve as pilot control for a train or vehicle equipped with vacuum operated brakes.

This invention is particularly adapted for use on "switcher" type locomotives which are used in places where it is required to move cars equipped with fluid pressure brakes of the automatic type and cars equipped with vacuum type brakes. Some switcher type locomotives are equipped with locomotive fluid pressure brake equipment having an independent brake valve for controlling same and a separate automatic vacuum brake valve for controlling the vacuum brakes on a car being moved. Other switcher type locomotives use brake equipment of the conventional pressure types standard on railroads in the United States which includes an automatic brake valve which may be of the well-known H–6 type and a conventional independent brake valve with the addition of a vacuum control valve mechanism responsive to variations in brake pipe pressure, effected by the engineer's automatic brake valve, to vary the pressure in a vacuum train pipe to obtain application and release of vacuum operated brakes on the cars corresponding to the application and release of the fluid pressure brakes on the locomotive. A locomotive brake equipment of the latter mentioned type is shown and described in the copending patent application Serial No. 490,089, filed February 23, 1955, by Harry C. May, and assigned to the assignee of the present invention.

In the aforesaid copending application there is described an improved vacuum control valve device comprising a pair of connected diaphragms subject to brake pipe pressure and sub-atmospheric vacuum train pipe pressures balanced against a reference pressure adapted to be maintained at a substantially constant pressure by a regulating valve. Arranged between said diaphragms for operation thereby is a valve which is adapted to move to an application position to briefly open the vacuum train pipe to atmosphere to reduce the vacuum therein in response to a reduction in brake pipe pressure and to be moved to a release position to connect a vacuum reservoir to the vacuum train pipe in response to an increase in brake pipe pressure. Safety control valve means are also provided for effecting a safety control application of the locomotive fluid pressure brakes, and thereby the vacuum operated train brakes, upon release of physical pressure from the safety control valve means with provisions for suppressing the safety control applications when a predetermined degree of brake cylinder pressure becomes effective on the locomotive.

It is the principal object of my invention to provide means incorporated in the locomotive brake equipment described in the aforesaid copending application operative to produce an automatic brake application in the event of a separation of a vacuum train pipe.

Another object is to provide an interlock valve means incorporated in a safety control application means which will operate in response to a rapid increase in vacuum train pipe pressure, such as would occur in the event of a separation of the vacuum train pipe, to effect a reduction in said safety control pipe pressure which will operate a safety control application valve means to effect a reduction in brake pipe pressure at a service application rate.

Other objects and advantages will appear in the following detailed description of the invention.

In the accompanying drawing, the single figure constitutes a diagrammatic view, partly in section and partly in outline, of a fluid pressure brake apparatus embodying the invention.

Description

As shown in the drawing, the improved brake apparatus comprises a vacuum control valve device 1 adapted to vary the sub-atmospheric pressure in a vacuum train pipe 2 inversely to the variations in pressure in a conventional brake pipe 3 realtive to a reference pressure established by a regulating valve device 4, an application valve device 5, a safety control valve device 6, a suppression valve device 7, a protection or interlock valve device 8, a universal valve device 119 and a locomotive brake cylinder device 120.

The vacuum control valve device 1 comprises a diaphragm 9 clamped about its periphery between two sections of a casing and defining therewith a control chamber 10 at one side, which chamber is connected to brake pipe 3, and at the other side a chamber 11 which is open to atmosphere through an atmospheric port 12. Contained in chamber 11 is a diaphragm follower 13 which extends through a suitable central opening in diaphragm 9 and is clamped to said diaphragm by means of a nut 14 contained in chamber 11. A stem 15 formed integrally with follower 13 extends across chamber 11 and makes a rigid connection with a cylindrically shaped slide valve 16 slidably mounted in a suitable bore in the casing. A longitudinal passage 17 formed in the valve 16 connects chamber 11 with a chamber 18 formed in the casing at the end of said valve away from chamber 11.

Formed in the casing about the upper end of slide valve 16 is an annular chamber 19 which is always open to atmosphere by way of a vent port 20 and may, under certain conditions which appear later, be connected through a cavity 21 in said slide valve to a similar annular chamber 22 which is always open through passage and pipe 23 to vacuum train pipe 2. Slidably mounted in a suitable opening in a partition wall 26 between chamber 18 and a chamber 27 is a stem 28 which is arranged to make abutting connection between slide valve 16 and a diaphragm follower 29 contained in the chamber 27. The stem 28 is encircled by a sealing ring 30 mounted in a casing which prevents leakage of fluid under pressure between chambers 18 and 27. The diaphragm follower 29 is secured by means of a plate 31 and a nut 32 to the center of a diaphragm 33 clamped at its periphery between two sections of the casing so as to define in part the chamber 27 at one side and a chamber 34 at the other side, the latter chamber being connected to the outlet of the regulating valve device 4 by way of passage and pipe 36.

The safety control valve device 6 comprises a casing containing a flexible diaphragm 37 arranged to operate a valve 38 to control communication between an inlet chamber 39 and an outlet chamber 40. The inlet chamber 39 is supplied with fluid under pressure from the usual feed valve device (not shown) by way of a safety control supply pipe 41, a choke 42, and a pipe 43 while the outlet chamber 40 is connected to a pipe 44 leading to the suppression valve device 8. Contained in chamber 39 is a spring 45 which constantly urges valve 38 inwardly towards its seated position. The diaphragm 37 is further adapted to cooperate with a valve seat 46 to control communication between the outlet chamber 40 and an atmospheric vent through a passage and pipe 47, a choke 48 and a whistle 49 in such a manner that, upon outward movement of said diaphragm under the action of spring 45, valve 38 will be seated and said atmospheric vent will be open. A bell crank 50, pivotally mounted in the casing for controlling the position of diaphragm 37, is provided with a horizontally extending pedal 51 adapted when subject to foot pressure by the operator to move said diaphragm inwardly into sealing contact with valve seat 46 and to unseat valve 38. A spring 52 is interposed between the casing and the bell crank 50 for operating the bell crank upon release of foot pressure thereon in a direction to permit outward movement of said diaphragm.

The suppression valve device 7 comprises a sectional casing, between two sections of which a diaphragm 53 is clamped about its periphery. At one side of diaphragm 53 is a control chamber 54 which is open to a brake cylinder pipe 25 leading to a brake cylinder device (not shown) and at the other side is a spring chamber 55 which is open to atmosphere by way of a vent port 56. Contained in chamber 55 is a follower 57 for diaphragm 53 having a stem 58 which is slidably mounted in a partition wall 59 between the chamber 55 and a valve chamber 60 connected to the protection interlock valve device 8 by way of a passage and pipe 61. A spring 62 encircles the stem 58 and engages the follower 57 in such a manner as to constantly urge the follower 57 and diaphragm 53 upwardly to position in which it is shown in the drawing.

In valve chamber 60 the stem 58 is operably linked to a valve 63 which is slidably guided by means of its fluted stem 64 in a bore 65 formed coaxially in a valve member 66 slidably mounted in the casing. Through this bore 65 communication may be established between chamber 60 and a chamber 67 which is connected through a passage and a safety control pipe 68 to the brake application valve device 5, mounted on a portion of a brake valve device 69. Thus, communication in bore 65 in valve member 66 is controlled by movement of diaphragm 53 acting through the medium of follower stem 58 and valve 63 to which it is linked.

The valve member 66 which is slidably mounted in a suitable bore in the casing of the valve device 7, takes part in defining intermediate its ends an annular chamber 70 in said bore, which chamber is connected to safety control valve device 6 by way of passage and pipe 43. The valve member 66 comprises a valve 72 formed at the lower end of said member and adapted to cooperate with a valve seat 73 formed in the casing to control communication between chambers 67 and 70. A spring 75 operably mounted in chamber 67 between the casing and the valve member 66 constantly urges the valve member toward a normal position in which valve 72 is seated, as shown in the drawing. As will appear more fully later, fluid under pressure supplied to chamber 54 will act on diaphragm 53 with sufficient force to overcome spring 62 to seat valve 63 and then to overcome spring 75 to unseat valve 72.

The protection or interlock valve device 8 comprises a pair of diaphragms 76 and 77 clamped about their respective peripheries between the several sections of a casing so as to be disposed in coaxially spaced relation to each other. The upper diaphragm 76, which is the smaller of the pair, divides said casing into a chamber 78 at the upper side which is connected to brake pipe 3 by way of a pipe 79, a cut-out cock 80 and a branch pipe 81, and at the lower side a chamber 82 which is open to atmosphere through a vent port 83. The larger, and likewise lower, diaphragm 77 divides said casing into a chamber 84 at its upper side which is open to vacuum train pipe 2 and separated from chamber 82 by a partition wall 85. A chamber 86 at the lower side of diaphragm 77 is connected to the outlet side of the regulating valve device 4 by way of pipe 36 and contains a spring 88 which engages a follower 89 for urging said diaphragm in an upward direction and thereby determines the degree of train pipe pressure at which valve device 8 will become operative, as will appear more fully later.

A partition wall 90 separates the chamber 86 from a chamber 91 which is connected by way of pipe 44 to valve chamber 40 in valve device 6. Contained in chamber 91 is a valve 92 which is operably guided by means of a fluted stem 93 in a bore 94 formed in a valve member 95, which in turn is slidably mounted in a suitable bore 96 in the casing. The bore 94 establishes communication between chamber 91 and a chamber 97 which is open through pipe 61 to chamber 60 in suppression valve device 7. An annular chamber 98 which is open to atmosphere through a vent port 199 encircles the valve member 95 and may be connected to chamber 97 past a valve 100 formed on the lower end of valve member 95, as viewed in the drawing, and adapted to operably engage a valve seat 101 formed in the casing at the lower end of bore 96. A spring 102 contained in chamber 97 urges valve member 95 upwardly toward its normal position in which valve 100 on valve member 95 cuts off communication between chamber 97 and the atmospheric chamber 98. As will appear more fully later, communication between chambers 91 and 97 may be cut off by action of valve 92 in response to downward movement of diaphragm 77 acting through the medium of a stem 103 of follower 89 and a link 104 with said valve, or downward movement of diaphragm 76 acting through the medium of a follower stem 104 to actuate follower 89 and its stem 103 downwardly.

*Operation—initial charging*

In operation, fluid under pressure is supplied to a main reservoir pipe 105 in the usual manner and thence to the regulating valve device 4. In accordance with the setting of the regulating valve device 4, fluid at a reduced pressure, such as 24 pounds, will flow from valve device 4 through pipe 36 to chamber 34 in the vacuum control valve device 1 where it will act in an upwardly direction on diaphragm 33. Fluid under pressure thus supplied to pipe 36 will also flow to chamber 86 in the protection interlock valve device 8 where it will act in an upwardly direction on diaphragm 77.

At the same time fluid under pressure supplied to brake pipe 3 at feed valve pressure from the usual brake valve device (not shown) in the usual manner will flow to chamber 10 in the vacuum control valve device 1 where it will act on diaphragm 9 in opposition to the action of diaphragm 33 in response to fluid under pressure in chamber 34. As described in the aforesaid copending application, the relative pressures acting on the diaphragms 9 and 33 will be such that valve 16 will be actuated downwardly to a position in which a vacuum reservoir 108 will be connected to vacuum train pipe 2 and chamber 27 by way of a pipe 109, an annular chamber 110, cavity 21 of slide valve 16, chamber 22 and a passage 111. As a vacuum is established in train pipe 2, a corresponding degree of vacuum will be established in chamber 27 connected thereto to the extent that fluid under pressure in chamber 34 will prevail, moving diaphragms 33, 9 and slide valve 16 upwardly to a position in which chamber 110 is cut off from cavity 21 by said valve, as shown in the drawing. In this position of valve device 1 the pressure of fluid in train pipe 2 will have been reduced enough to effect a release of vacuum brakes on the train in the usual manner.

As previously noted, fluid under pressure supplied to pipe 36 from regulating valve device 4 will also flow to chamber 86 in the protection interlock valve device 8, where it will act in an upwardly direction on diaphragm 77. Fluid under pressure supplied to brake pipe 3 will also flow by way of pipe 81, cut-out cock 80 and pipe 79 to chamber 78 in the protection interlock valve device 8 where it will act on the diaphragm 76 and follower stem 104 in opposition to the action of diaphragm 77 in response to the aforesaid fluid pressure in chamber 86. As a vacuum is established in train pipe 2, a corresponding degree of vacuum, or sub-atmospheric pressure, will be established in chamber 84 thereby establishing a differential force which will act upwardly on diaphragm 77 so as to establish under normal release, or running, condition a substantial balance of fluid pressures acting on the opposing diaphragms 76 and 77. The value of the spring 88, however, will be such as to hold the diaphragms 76 and 77 in their normal positions in which they are shown in the drawing. In this normal position valve 92 will be unseated while valve 100 will be seated, thereby establishing open communication between pipes 44 and 61.

Fluid supplied to brake pipe 3 at feed valve pressure will also flow through pipe 81 to the universal valve 119 in response to which said device will move to release position as described in the aforesaid copending application, in which position its associated reservoirs will be charged in the usual manner and a release communication by way of pipe 25 for brake cylinder device 120 will be established.

With the brake valve device (not shown) in release and charging position, safety control supply pipe 41 will be supplied with fluid at feed valve pressure in the usual manner. With the pedal 51 of the valve device 6 pressed downward by the operator to its lower position as shown for normal operation, fluid under pressure in safety control supply pipe 41 will flow through the choke 42 and pipe 43 to chamber 39 in said valve device, thence past valve 38, and through chamber 40 and pipe 44 to chamber 91 in a valve device 8. With valve devices 7 and 8 in their normal positions as shown in the drawing fluid under pressure thus supplied to chamber 91 will flow past valve 92, through bore 94, chamber 97, passage and pipe 61 to chamber 60 in the suppression valve device 7. Fluid under pressure thus supplied to chamber 60 will flow past valve 63 and through bore 65 in valve member 66 to chamber 67, whence it will flow through safety control passage and pipe 68 to the safety control application valve device 5, which will respond thereto to assume a normal condition by maintaining the usual brake pipe vent passage closed in the usual manner. This application valve device 5 may be any of the well-known types which are adapted to respond to normal safety control pipe pressure to keep an atmospheric vent passage for brake pipe closed and to respond to a predetermined reduction in safety control pipe pressure by venting said brake pipe to atmosphere at a controlled rate.

*Application and release of the brakes*

As just described, said equipment is now conditioned for making a brake application in the manner described in detail in the aforesaid copending application. In brief, when it is desired to make a brake application, a reduction in brake pipe pressure is made in the usual manner, thereby causing valve device 119 to supply fluid under pressure through pipe 25 to brake cylinder device 120 to apply the brakes on the locomotive and at the same time effecting a reduction in pressure of fluid in chamber 10 to cause an application of the vacuum brakes in the train. In response to this fluid pressure reduction in chamber 10, fluid under pressure in chamber 34 acting on diaphragm 33 will actuate follower 29, stem 28 and slide valve 16 upwardly to a position in which the vacuum pipe 2 is opened to atmosphere through passage 111, chamber 22, cavity 21 and atmospheric passage 20. Fluid under pressure will flow from atmosphere to vacuum pipe 2 by way of the described route and from said route through choked passage 112 to chamber 27 until the resulting increase in pressure in said chamber actuates diaphragm 33 downwardly far enough to permit slide valve 16 to be actuated downwardly and close the atmospheric passage 20. The resulting decrease in vacuum in the train pipe 2 will effect an application of the vacuum brakes in the train in the usual well-known manner.

The reduction in fluid pressure effected in brake pipe 3 and in chamber 10 of valve device 1 will be substantially duplicated in chamber 78 of the valve device 8, while the increase in pressure in vacuum train pipe 2 and in chamber 27 of device 1 will be substantially duplicated in chamber 84 of valve device 8 by reason of the above-described operation of the vacuum control valve device 1. The resulting reduction in pressure in chamber 78 will merely cause a temporary upward deflection of diaphragms 76 and 77, however, which action will not change the operative condition of the valves or the connections of any of the associated communications.

The brakes on the cars and the locomotive may be released by restoring the pressure of fluid in the brake pipe 3 to its normal degree. The increase in fluid pressure in chamber 10 of valve device 1 resulting from the increase in brake pipe pressure will act downwardly on diaphragm 9 to cause same to move valve 16 to its release position. In release position of slide valve 16 vacuum reservoir 108 will again be connected to vacuum train pipe 2 by way of pipe and passage 109, cavity 21, chamber 22, passage 111 and pipe 23; the pressure in the train pipe 2 will thereby be reduced sufficiently to effect a release of the vacuum brakes in the train in the usual manner.

Since the brakes on the locomotive are of the automatic fluid pressure type, the increase in brake pipe pressure will cause the universal valve device 119 to effect a release of the brakes on the locomotive in the same way as previously described in connection with initial charging.

*Safety control feature*

As described in the aforesaid copending application, the safety control feature provides an automatic service brake application of the train vacuum and locomotive fluid pressure brakes if, for any reason, a locomotive operator does not keep the pedal 51 depressed, the only difference being that of the interposition of the safety interlock valve device 8 between the pipes 44 and 61 leading to the safety control valve device 6 and the suppression valve device 7, respectively. With the valve device 8 positioned, as shown in the drawing, the safety control operation will be substantially the same as described in the aforesaid copending application.

When the operator's foot is removed from the pedal 51, said pedal is rocked in a counterclockwise direction by action of spring 52, thereby permitting supply valve 38 to be seated by action of spring 45 and to cut off supply of fluid under pressure from safety control supply pipe 41. Upward movement of pedal 51 also permits diaphragm 37 to deflect toward the right under the action of spring 45 and pressure of fluid in chamber 40. With diaphragm 37 out of engagement with valve seat 46 fluid under pressure in the usual control chamber (not shown) of application valve device 5 will flow through safety control pipe and passage 68, chamber 67 in valve device 7, bore 65 in valve member 66, chamber 60, pipe and passage 61, chamber 97 in valve device 8, valve member 95, chamber 91, pipe and passage 44, chamber 40 in valve device 6, pipe 47, choke 48 and whistle 49 to atmosphere to sound an alarm. If the operator does not immediately depress pedal 51 again, the pressure of fluid in the control chamber of the application valve device 5 will be reduced sufficiently by flow through the aforesaid route to cause the application valve device to operate in the usual manner to reduce brake pipe pressure at a service rate of reduction to effect service application of the fluid pressure brakes on the locomotive by operation of the universal valve device 119 in the usual manner.

As previously noted, a reduction in brake pipe pressure in chamber 78 will cause diaphragms 76 and 77 to deflect upwardly. This upward diaphragm movement will not affect the operative disposition of the valves in the valve device 8.

Suppression of a safety control application

It will be noted that during the safety control application, effected as just described, the valve 63 of the suppression valve device 7 remained unseated. When a service application of brakes on the locomotive is being effected, fluid under pressure is supplied from the universal valve device 119 to the brake cylinder device 120 by way of the brake cylinder pipe 25, and fluid under pressure thus supplied to said pipe will flow to chamber 54 in suppression valve device 7. When pressure of fluid in chamber 54 attains a predetermined degree of pressure such as fifty pounds, such fluid pressure acting on diaphragm 53 will deflect said diaphragm downwardly against the action of the spring 62 to actuate valve 63 to its seated position, in which position flow of fluid under pressure from application valve device 5 to atmosphere through valve devices 7 and 8, and valve device 6, which flow would effect a safety control application of brakes, is cut off. Thus any time a brake application is effected to a degree determined by the value of the spring 62, the safety control valve device 6 will be rendered incapable of effecting a safety control application of the locomotive and train brakes. Continued downward movement of diaphragm 53 will actuate valve member 66 downwardly against the force of spring 75, thereby reconnecting pipe 43 to safety control pipe 68 to retain application valve device 5 in its normal position.

Break-in-two-protection

With the brakes conditioned for running operation the brake apparatus will be charged as previously described in connection with initial charging and the vacuum control valve device 1 will be positioned as shown in the drawing. In this position pressure of fluid in chamber 34 will be maintained at a chosen degree by operation of the regulating valve device 4, against which the brake pipe pressure in chamber 10 together with vacuum train pipe pressure in chamber 27 will be balanced so as to maintain a corresponding degree of vacuum in chamber 27 connected to brake pipe 2. At the same time the protection interlock valve device 8 will be maintained in the position shown in the drawing by action of spring 88 and the pressure of fluid in chamber 86 at the same degree as that in chamber 34 of valve device 1 against the vacuum, or sub-atmospheric, pressure in chamber 84 which is the same as that in train pipe 2 and brake pipe pressure in chamber 78.

When effecting normal reduction in brake pipe pressure and thereby corresponding reductions in vacuum or increases in train pipe pressure for obtaining the usual service applications of the combined brakes, the preponderance of forces acting in an upwardly direction in valve device 8 will retain valve 92 in its open position and valve 100 in its seated position so that pipes 44 and 61 will be connected in readiness for an initiation of a safety control application.

When, for example, a hose connecting the train pipe is parted, this break-in-two will cause an application of vacuum brakes and also through said train pipe effect an increase in fluid pressure in chamber 27 of the vacuum control valve device 1 connected thereto. This increase of fluid pressure in chamber 27 will cause diaphragm 33 to deflect downwardly, and, through the medium of diaphragm follower 29 will actuate the plunger 28 downwardly. With pressure in chamber 10 being maintained at normal brake pipe pressure, slide valve 16 will be actuated downwardly thereby to a position in which cavity 21 will connect vacuum reservoir 108 to vacuum train pipe 2 in the same manner as when releasing the brakes in response to an increase in brake pipe pressure. Thus, the usual vacuum exhauster (not shown) connected to vacuum reservoir 108 will be working vainly to effect a release of the vacuum train pipe through a separated train hose. However, as will hereinafter appear, the protection interlock valve device 8 will operate to initiate an automatic brake application by effecting a reduction in brake pipe pressure, which will also become effective in chamber 10. The resulting reduction in brake pipe pressure in chamber 10 will permit the substantially constant pressure in chamber 34 to actuate diaphragm 33 and thereby slide valve 16 upwardly to a position in which communication between cavity 21 in said slide valve and pipe 109 leading to vacuum reservoir 108 will be cut off, as in effecting a normal application of the brakes.

The increase in fluid pressure in chamber 84 in valve device 8 resulting from a hose separation in train pipe 2 acting in combination with the brake pipe pressure in chamber 78 will be sufficient to overcome the opposing forces of fluid pressure in chamber 86 and spring 88 and will therefore actuate diaphragms 76 and 77 downwardly, first seating valve 92 and then cutting off communication between pipes 44 and 61 and isolating diaphragm foot valve device 6 from application valve device 5. Continued downward movement of diaphragms 76 and 77 will act through the medium of stem 103 and valve 92 to actuate valve member 95 and thereby valve 100 downwardly against the action of spring 102, unseating valve 100. With valve 100 unseated, fluid under pressure in the control chamber (not shown) of application valve device 5 will flow to atmosphere by way of pipe and passage 68, chamber 67, bore 65 and valve member 66, chamber 60, whence it will flow through pipe and passage 61 to chamber 97 in valve device 8, and thence past valve 100 to atmosphere by way of passage 99. As in the case of effecting a safety control application as previously described, a reduction in fluid pressure in pipe 68 and the aforesaid connected control chamber will cause the application valve device 5 to effect a reduction in brake pipe pressure at a service rate and thereby an automatic fluid pressure brake application.

It should be noted that the protection valve operation described in the preceding paragraph is interlocked with the operation of the suppression valve device 7 so that, if the fluid pressure operated brakes are fully applied, a break-in-two of the train pipe will not render the application valve device 5 operative. This is desirable because nothing can be gained by the operation of valve device 5 if the fluid pressure brakes are already fully applied.

Summary

From the foregoing it will be seen that I have provided in a combined vacuum operated train brake and fluid pressure operated locomotive brake apparatus of the type in which operation of the vacuum operated train brake is piloted by the control of the automatic fluid pressure brake, an improved protection valve means which is operative upon a reduction of vacuum in the train pipe, such as would result from a separation of the vaccum train pipe, which will automatically effect an application of the vacuum operated train brakes, to automatically effect a like brake application in the automatic fluid pressure brake apparatus associated therewith on the locomotive. Should there be fluid pressure brake apparatus on cars in the train connected to the fluid pressure brake pipe, those brakes controlled thereby will also be automatically applied.

Having now described the invention, what I claim as new and desire to secure by Letters Patent, is:

1. In a combined fluid pressure operated and vacuum operated railway brake equipment in which operation of the vacuum operated brake equipment is piloted by the operation of the fluid pressure operated brake equipment, in combination, a brake pipe normally charged with fluid under pressure which may be reduced to initiate a brake application by the fluid pressure operated brake equipment, a vacuum train pipe normally exhausted of fluid under pressure to a certain sub-atmospheric pressure which may be increased to initiate a brake application by the vacuum operated brake equipment; a safety control pipe adapted to be maintained charged with fluid at a preselected degree of pressure, application valve means operative upon reduction in pressure of fluid in said safety control pipe to effect a reduction in fluid pressure in said brake pipe, safety control valve means adapted to be normally positioned for maintaining said safety control pipe charged to said preselected degree of fluid pressure and operable to effect a reduction in pressure in said safety control pipe, and protection valve means comprising movable abutment means subject to pressure of fluid in said brake pipe and of fluid in said train pipe acting in one direction and to a reference pressure acting in the opposite direction and valve means normally establishing communication between said safety control valve means and said safety control pipe and operable by movement of said movable abutment means in said one direction in response to a certain increase in pressure in said vacuum train pipe toward atmospheric pressure to disconnect said communication and connect said safety control pipe to atmosphere for effecting reduction in pressure of fluid therein.

2. In a combined fluid pressure operated and vacuum operated railway brake equipment in which operation of the vacuum operated brake equipment is piloted by the operation of the fluid pressure operated brake equipment, in combination, a brake pipe normally charged with fluid under pressure which may be reduced to initiate a brake application by the fluid pressure operated brake equipment, a vacuum train pipe normally exhausted of fluid under pressure to a certain sub-atmospheric pressure which may be increased to initiate a brake application by the vacuum operated brake equipment, a safety control pipe adapted to be maintained charged with fluid at a preselected degree of pressure, application valve means operative upon reduction in pressure of fluid in said safety control pipe to effect a reduction in fluid pressure in said brake pipe, safety control valve means adapted to be normally positioned for maintaining said safety control pipe charged to said preselected degree of fluid pressure and operable to effect a reduction in pressure in said safety control pipe, protection valve means comprising movable abutment means subject to pressure of fluid in said brake pipe and of fluid in said train pipe acting in one direction and to a reference pressure acting in the opposite direction, resilient means biasing said movable abutment means in said opposite direction and valve means normally connecting said safety control valve means to said safety control pipe and operable by movement of said movable abutment means in response to an increase in said vacuum train pipe toward atmospheric pressure to disconnect said safety control valve means from said safety control pipe, and regulating valve means operative to supply fluid under pressure to maintain said reference pressure at a constant predetermined degree.

3. In a combined fluid pressure operated and vacuum operated railway brake equipment in which the operation of the vacum operated brake equipment is piloted by the operation of the fluid pressure operated brake equipment, in combination, a brake pipe normally charged with fluid under pressure which may be reduced to initiate a brake application by the fluid pressure operated brake equipment, a vacuum train pipe normally exhausted of fluid under pressure to a certain sub-atmospheric pressure which may be increased to initiate a brake application by the vacuum brake equipment, valve means operative in response to a reduction in brake pipe pressure below its normal charge value to admit atmospheric air to said vacuum train pipe for increasing vacuum train pipe pressure to an extent corresponding to the extent of such reduction in brake pipe pressure for thereby causing a degree of brake application by the vacuum-operated brake equipment corresponding to the degree of brake pipe pressure reduction, a safety control pipe adapted to be maintained charged with fluid at a preselected degree of fluid pressure, application valve means operative upon reduction in fluid pressure in said safety control pipe to effect a reduction in fluid pressure in said brake pipe, safety control valve means adapted to be normally positioned for maintaining said safety control pipe charged to said preselected degree of fluid pressure and operable to effect a pressure reduction in said safety control pipe, protection valve means subject to vacuum train pipe pressure and brake pipe pressure acting in opposition to a reference pressure and normally establishing communication between said safety control valve means and said safety control pipe, said protection valve means being operable in response to a certain increase in pressure in said vacuum train pipe toward atmospheric pressure to disconnect said communication and open said safety control pipe to atmosphere for effecting reduction in pressure of fluid therein, and regulating valve means operative to maintain said reference pressure at a constant predetermined degree.

4. In a combined fluid pressure operated and vacuum operated railway brake equipment in which the operation of the vacuum operated brake equipment is piloted by the operation of the fluid pressure operated brake equipment, in combination, a brake pipe normally charged with fluid under pressure which may be reduced to initiate a brake application by the fluid pressure operated brake equipment, a vacuum train pipe normally exhausted of fluid under pressure to a certain sub-atmospheric pressure which may be increased to initiate a brake application by the vacuum brake equipment, a vacuum reservoir, vacuum control valve means for so controlling connection of said vacuum train pipe with said vacuum reservoir or the atmosphere as to normally maintain said vacuum train pipe exhausted to said certain sub-atmospheric pressure, and to effect an increase in vacuum train pipe pressure responsively to, and to an extent proportionate to, the extent of such reduction in brake pipe pressure below its normal charge value, a safety control pipe adapted to be maintained charged with fluid at a preselected degree of fluid pressure, application valve means operative upon reduction in fluid pressure in said safety control pipe to effect a reduction in fluid pressure in said brake pipe, safety control valve means adapted to be normally positioned for maintaining said safety control pipe charged to said preselected degree of fluid pressure and operable to effect a pressure reduction in said safety control pipe, and protection valve means comprising movable abutment means subject to pressure of fluid in said brake pipe and of fluid in said train pipe acting in one direction and to a reference pressure acting in the opposite direction, and valve means normally establishing communication between said safety control valve means and said safety control pipe and operable by movement of said movable abutment means in said one direction in response to a certain increase in pressure in said vacuum train pipe toward atmospheric pressure to disconnect said communication and connect said safety control pipe to atmosphere for effecting reduction in pressure of fluid therein.

5. In a combined fluid pressure operated and vacuum operated railway brake equipment in which operation of the vacuum operated brake equipment is piloted by the operation of the fluid pressure operated brake equipment, in combination, a brake pipe normally charged with fluid under pressure which may be reduced to initiate a brake application by the fluid pressure operated brake equipment, a vacuum train pipe normally exhausted of fluid under pressure to a certain sub-atmospheric pressure which may be increased toward atmospheric pressure to initiate a brake application by the vacuum operated brake equipment, a safety control pipe adapted to be maintained charged with fluid at a particular degree of pressure, application valve means operative upon reduction in pressure of fluid in said safety control pipe to effect a reduction in fluid pressure in said brake pipe, safety control valve means adapted to be normally positioned for maintaining said safety control pipe charged to said particular degree of fluid pressure and operable to effect a pressure reduction in said safety control pipe, protection valve means normally establishing communication between said safety control valve means and said safety control pipe and operative in response to a certain increase in pressure in said vacuum train pipe toward atmospheric pressure to disconnect said communication and open said safety control pipe to atmosphere for effecting a pressure reduction therein, and suppression valve means normally permitting flow through said safety control pipe between said application valve means and said protection valve means and operative in response to a predetermined degree of brake application to prevent such flow and thereby prevent operation of said application valve means.

6. The combination denfied in claim 5 in which the suppression valve means further includes valve means also operative in response to a predetermined degree of brake application to maintain said safety control pipe charge to the aforesaid particular degree independently of said protection valve means and thereby further insure the application valve means remaining inoperative.

7. In a combined locomotive fluid pressure and vacuum brake equipment, in combination, a fluid pressure brake pipe, fluid pressure operable brake applying means, brake controlling means operative in response to a reduction in brake pipe pressure to supply fluid under pressure to said brake applying means, a vacuum train pipe adapted to be maintained at sub-atmospheric fluid pressures and to be opened to atmosphere for increasing pressure to effect an application of vacuum brakes, a vacuum reservoir containing fluid at sub-atmospheric pressure, vacuum control valve means operative in response to a reduction in brake pipe pressure to admit fluid under pressure from atmosphere to said train pipe to effect a degree of application of vacuum brakes corresponding to the degree of brake pipe pressure reduction, said vacuum control valve means comprising movable abutment means subject to pressure of fluid in said brake pipe and of fluid in said train pipe acting in one direction and to a reference fluid pressure acting in the opposite direction, and valve means operable by movement of said movable abutment means in said one direction to connect said vacuum reservoir to said train pipe and by movement in said opposite direction to cut off said vacuum reservoir from said train pipe and admit fluid under pressure from atmosphere to said train pipe, regulating valve means operative to maintain said reference fluid pressure at a constant predetermined value, a safety control pipe adapted to be charged with fluid at a particular degree of pressure, application valve means operative upon reduction in pressure in said safety control pipe to effect a reduction in brake pipe pressure, safety control valve means adapted to be normally positioned for maintaining said safety control pipe charged to said particular degree of fluid pressure and operable to effect a pressure reduction in said safety control pipe, protection valve means normally establishing communication between said safety control valve means and said safety control pipe and operative in response to a certain increase in pressure in said vacuum train pipe toward atmospheric pressure to disconnect said communication and open said safety control pipe to atmosphere for effecting a pressure reduction therein, and suppression valve means normally permitting fluid flow through said safety control pipe between said application valve means and said protection valve means and operative in response to a predetermined degree of pressure of fluid supplied to said brake applying means to prevent such flow and thereby prevent operation of said application valve means.

8. The combination defined in claim 7 in which the suppression valve means further includes valve means also operative in response to a predetermined degree of pressure of fluid supplied to said brake applying means to maintain said safety control pipe charged to the aforesaid particular degree and thereby further insure the application valve means remaining inoperative.

9. In a locomotive fluid pressure brake equipment, in combination, a fluid pressure brake pipe normally charged with fluid under pressure, fluid pressure operable brake applying means, brake controlling means operative in response to a reduction in brake pipe pressure to supply fluid under pressure to said brake applying means, a vacuum train pipe adapted to be maintained normally at a certain sub-atmospheric fluid pressure which may be increased to effect a vacuum operated brake application, a vacuum reservoir, vacuum control valve means for so controlling connection of said vacuum train pipe with said vacuum reservoir or the atmosphere as to normally maintain said vacuum train pipe exhausted to said certain sub-atmospheric pressure, and to effect an increase in vacuum train pipe pressure responsively to, and to an extent proportionate to, the extent of such reduction in brake pipe pressure below its normal charge value, a fluid pressure safety control pipe normally charged with fluid under pressure, an application valve means operative in response to reduction in pressure of fluid in said safety control pipe to effect a reduction in brake pipe pressure, safety control valve means for venting fluid under pressure from said safety control pipe to effect a reduction in pressure of fluid therein, and protection valve means interposed between said safety control valve means and said safety control pipe and operative upon a predetermined increase in pressure in said vacuum train pipe to cut off said safety control pipe from said safety control valve means and connect said safety control pipe to atmosphere, whereby the resulting reduction in brake pipe pressure effected by the application valve means causes said vacuum control valve means to correspondingly increase said vacuum train pipe pressure and causes said brake controlling means to supply fluid under pressure to said brake applying means.

References Cited in the file of this patent

UNITED STATES PATENTS

| | | |
|---|---|---|
| 1,471,073 | Thomas | Oct. 16, 1923 |
| 1,727,385 | Winter | Sept. 10, 1929 |
| 2,173,940 | Hewitt et al. | Sept. 26, 1939 |